(12) United States Patent
Ball et al.

(10) Patent No.: US 8,047,072 B2
(45) Date of Patent: *Nov. 1, 2011

(54) PLASTIC WATER METER WITH METAL THREADS

(75) Inventors: Marty Scott Ball, Jonesville, NC (US); Jeremy Alan McCraven, Kannapolis, NC (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/947,272

(22) Filed: Nov. 16, 2010

(65) Prior Publication Data

US 2011/0072896 A1   Mar. 31, 2011

Related U.S. Application Data

(63) Continuation of application No. 12/356,240, filed on Jan. 20, 2009, now Pat. No. 7,854,165.

(60) Provisional application No. 61/022,088, filed on Jan. 18, 2008.

(51) Int. Cl.
 *G01F 15/14* (2006.01)
 *G01F 3/12* (2006.01)
 *F16L 47/00* (2006.01)

(52) U.S. Cl. ............... 73/201; 73/258; 73/273; 285/239

(58) Field of Classification Search .................. None
 See application file for complete search history.

(56) References Cited

U.S. PATENT DOCUMENTS

| | | | |
|---|---|---|---|
| 4,778,204 A | 10/1988 | Berger | |
| 5,261,275 A | 11/1993 | Davis | |
| 5,437,481 A | 8/1995 | Spears et al. | |
| 5,509,567 A | 4/1996 | Lindahl | |
| 5,655,299 A | 8/1997 | Lindahl | |
| 5,746,344 A | 5/1998 | Syler et al. | |
| 6,178,816 B1 | 1/2001 | Katzman et al. | |
| 6,581,458 B1 | 6/2003 | Hathaway et al. | |
| 6,701,956 B1 | 3/2004 | Berger | |
| 6,848,303 B2 | 2/2005 | Oeder et al. | |
| 7,143,645 B2 | 12/2006 | Benson et al. | |
| 7,854,165 B2 * | 12/2010 | Ball et al. ..................... | 73/201 |

OTHER PUBLICATIONS

Ball; U.S. Patent Application Entitled: Plastic Water Meter with Metal Threads; U.S. Appl. No. 12/356,240, filed Jan. 20, 2009.
Ball; Notice of Allowance and Fee(s) Due mailed Aug. 9, 2010 for U.S. Appl. No. 12/356,240, filed Jan. 20, 2009.

(Continued)

*Primary Examiner* — Harshad Patel
(74) *Attorney, Agent, or Firm* — Taylor English Duma LLP

(57) ABSTRACT

Embodiments of the present invention generally relate to flow meters and more particularly to improved plastic water flow meters for commercial or residential use. In various embodiments, a plastic water meter is provided that may include metal threads for connecting the water meter to a water system. In particular, the plastic water meter may include at least one spud that is shaped to receive and engage a plastic spud insert, in which the plastic spud insert may include a metal ring with a threaded outer surface. The plastic spud insert may include an annular lip portion extending outwardly to discourage removal of the metal ring when the spud insert is engaged with the water meter. Furthermore, the plastic spud insert and the inner surface of the metal ring may have complementary circumferential profiles to discourage relative rotation between the metal ring and the spud insert.

20 Claims, 3 Drawing Sheets

OTHER PUBLICATIONS

Ball; U.S. Provisional Patent Application Entitled: Plastic Water Meter; U.S. Appl. No. 61/022,088, filed Jan. 20, 2008.

Brochure entitled, "DoubleSafe(TM) Transition Fittings from GF Piping Systems" Georg Fischer Piping Systems; date unknown when published; accessed on Oct. 1, 2008; pp. 1-2; http://www.us.piping.georgefischer.com/go/F017C7DA19993E1D340739AFBC4B677E?action=GF_DocumentDownload&doc_uuid=F017C7DA19993E1D340739AFBC4B677E.

Brochure entitled, "Transition Fittings, Strong and Reliable Metal-to-Plastic Transitions", BR-2-0305; date unknown when published; accessed on Oct. 1, 2008; pp. 1-2; http://www.plascowelding.com/pdf2007/PVC&CPVCPipeandFittings/Thermoplastic-Fittings/PVC&CPVC-Metal-To-Plastic-Transition-Fittings-Product-Br.PDF.

Brochure entitled, "POLYRAC and POLYFAST", date unknown when published; accessed on Jun. 1, 2009; pp. 1-8; http://www.cn.piping.georgfischer.com/doc/doc_download.cfm?B81010EAD60EB5F06E54F6B04231161F.

Brochure entitled, "The World Needs Solutions, We Have Them!," date unknown when published; accessed on Oct. 1, 2008; pp. 1-12; http://www.plasticsystems.co.nz/booklets/Civil%20Infrastructure/+GF+%20Utilities%20Brochure.pdf.

Article entitled, "GF Piping Systems' New Metal-to-Plastic Transition Fittings Provide Strong, Leak-Proof Seals", Nov. 13, 2007, pp. 1-6; http://news.thomasnet.com/fullstory/Metal-to-Plastic-Transition-Fittings-offer-leak-proof-seals-536342.

Brochure entitled, "Section 1, Schedule 80 PVC Piping System," Mar. 27, 2006, pp. 1.1-1.32; http://web.archive.org/web/20060820181520/www.gfpiping.com/downloads/vinyls/01-Sch80PVC.pdf.

Brochure entitled, "Section 2, Schedule 80 CPVC Piping System," Mar. 27, 2006, pp. 2.1-2.28; http://web.archive.org/web/20061017014438/www.gfpiping.com/downloads/vinyls/02-Sch80CPVC.pdf.

Applicant: Hersey meters Co., LLC; Office Action from Canadian Intellectual Property Office for related application No. 2,650,174, having a filing date of Jan. 19, 2009, mailed Dec. 7, 2010, 2 pages.

* cited by examiner

PLASTIC WATER METER WITH METAL THREADS

CROSS REFERENCE TO RELATED APPLICATION

This application is a continuation of U.S. patent application Ser. No. 12/356,240, filed Jan. 20, 2009, which claims the benefit of U.S. Provisional Patent Application Ser. No. 61/022,088, filed Jan. 18, 2008, which are both hereby incorporated herein in their entirety by reference.

BACKGROUND OF THE INVENTION

1. Field of the Invention

The present invention generally relates to flow meters and more particularly to improved plastic water flow meters for commercial and residential use.

2. Description of Related Art

Water meters are designed to measure the volume of water usage or the volume of water flow. Water meters can be used in both commercial and residential settings, and they can be utilized at a water source, a point of water usage, or anywhere in between. Typically, water meters are manufactured from one of two types of material: metal or plastic. The trend with water meters is towards the use of plastic meters, as opposed to metal meters. One reason for this trend is that many jurisdictions now require zero lead content in the water supply and accordingly, meters in contact with the water supply also need to have zero lead content. Plastic meters satisfy this zero lead content requirement.

Generally, a water meter possesses threaded inlets and outlets to facilitate the connection between the water meter and the water system. Plastic water meters generally utilize plastic threads, but water systems typically employ metal threads for the mating connections with water meters. Accordingly, the plastic threads have a tendency to strip or cross thread during installation. Therefore, there is a desire for a plastic water meter with improved inlet and outlet connectivity.

BRIEF SUMMARY OF THE INVENTION

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

In one embodiment of the present invention, a water meter is provided. The water meter may include a plastic top cover defining an interior cavity shaped to accept a metering device, in which the top cover further defines at least one spud defining a bore in communication with the interior cavity; a metering device positioned in the interior cavity; a bottom cover engaging the top cover and enclosing the metering device within the interior cavity; and at least one connector assembly engaging the at least one spud. The connector assembly may include a plastic spud insert having a first end and a second end, in which the plastic spud insert may include an engagement portion proximate the first end engaging the spud, an annular lip portion positioned proximate the second end and extending outwardly, and a collar portion having a circumferential profile and positioned intermediate the engagement portion and lip portion. The assembly may also include a metal ring having an inner surface and outer surface, in which threads may be formed on the outer surface and the inner surface may have a profile complementary with the profile of the collar, the metal ring may be positioned proximate the lip portion with the inner surface engaging the collar portion, and the circumferential profile of the collar portion and the complementary profile of the metal ring may be configured to discourage relative relational movement. In alternative embodiments, the water meter may include an inlet spud and an outlet spud and an inlet connector assembly and an outlet connector assembly, in which each connector assembly may engage its respective inlet spud or outlet spud. In such embodiments, the inlet spud may be situated approximately 180 degrees opposite the outlet spud. In regard to the materials that makeup the components of the connector assembly, the plastic top cover and/or the plastic spud insert may be styrene, polystyrene, nylon, or glass reinforced thermoplastic, among other materials, and the metal ring may be brass, bronze, a brass derivative, a bronze derivative, or stainless steel, among other materials. Furthermore, the metering device included in the water meter may be a nutating disk displacement flow meter. Even more, the engagement portion of the plastic spud insert may engage the spud by a mild interference fit and may be secured to the spud by spin welding, solvent welding, sonic welding, or by an adhesive, among other methods. Additionally, the circumferential profile of the collar may define various shapes, including a shape having at least one linear section, a shape having a plurality of linear sections, and a substantially oval shape, among other shapes. Furthermore, the inner surface of the metal ring may engage the collar portion by a key-fit arrangement.

In another embodiment of the present invention, a connector assembly for use with a plastic device having a spud defining a bore is provided. The assembly may include a plastic spud insert having a first end and a second end, in which the plastic spud insert may include an engagement portion proximate the first end configured to engage with the bore, an annular lip portion positioned proximate the second end and extending outwardly, and a collar portion having a circumferential profile and positioned intermediate the engagement portion and lip portion. The assembly may also include a metal ring having an inner surface and outer surface, in which threads may be formed on the outer surface and the inner surface may have a profile complementary with the profile of the collar, the metal ring may be positioned proximate the lip portion with the inner surface engaging the collar portion, and the circumferential profile of the collar portion and the complementary profile of the metal ring may be configured to discourage relative relational movement. The circumferential profile of the collar may define various shapes, including a shape having at least one linear section, a shape having a plurality of linear sections, and a substantially oval shape, among other shapes. Furthermore, the inner surface of the metal ring may engage the collar portion by a key-fit arrangement. As for the materials that makeup the components of the connector assembly, the plastic spud insert may be styrene, polystyrene, nylon, or glass reinforced thermoplastic, among other materials, and the metal ring may be brass, bronze, a brass derivative, a bronze derivative, or stainless steel, among other materials.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
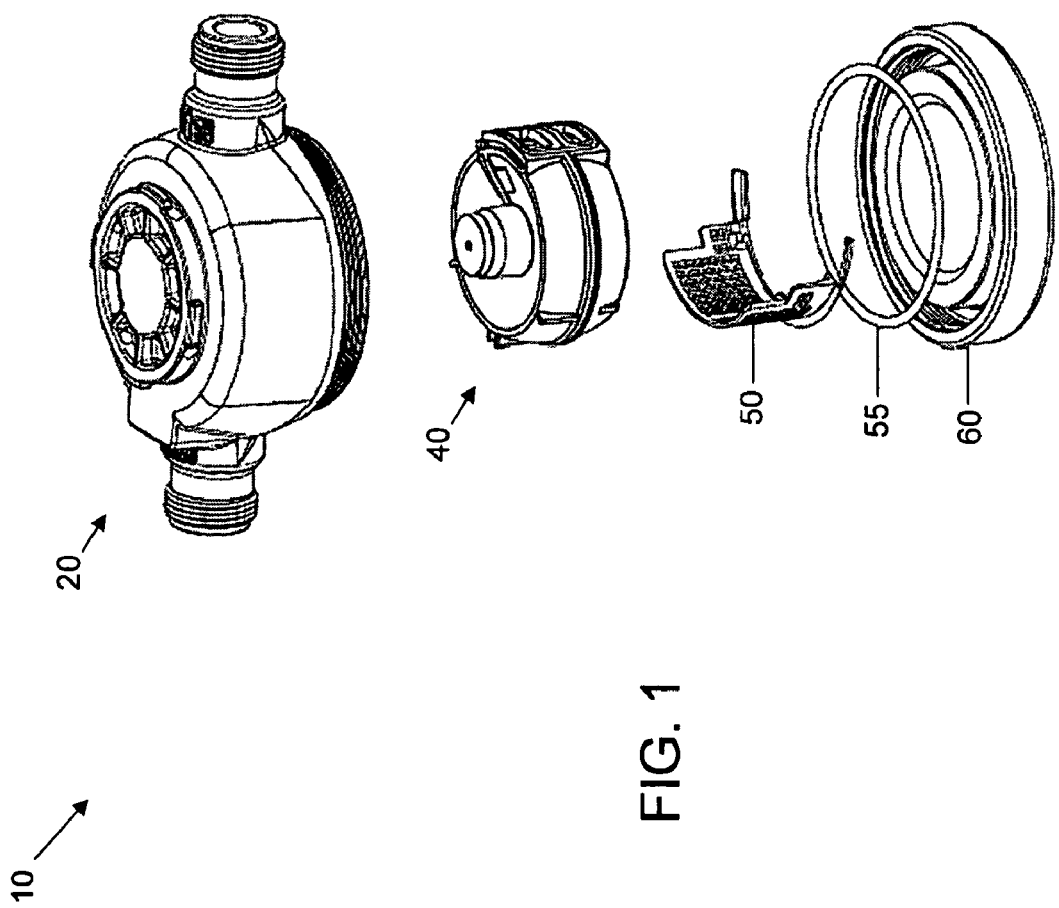
FIG. 1 is an exploded view of a plastic water meter 10 according to one embodiment of the present invention.

Various embodiments of the present invention provide improved plastic water meters that address issues known in the art, some of which are discussed above. FIG. 1 illustrates a plastic water meter 10 according to one embodiment of the present invention. This embodiment may include a water meter housing assembly 20 that may enclose a metering device 40 and a strainer 50. The metering device 40 and the strainer 50 may be positioned inside the housing assembly 20, and a bottom cover 60 and an o-ring 55 may enclose them within the housing assembly 20.

Figure 2:
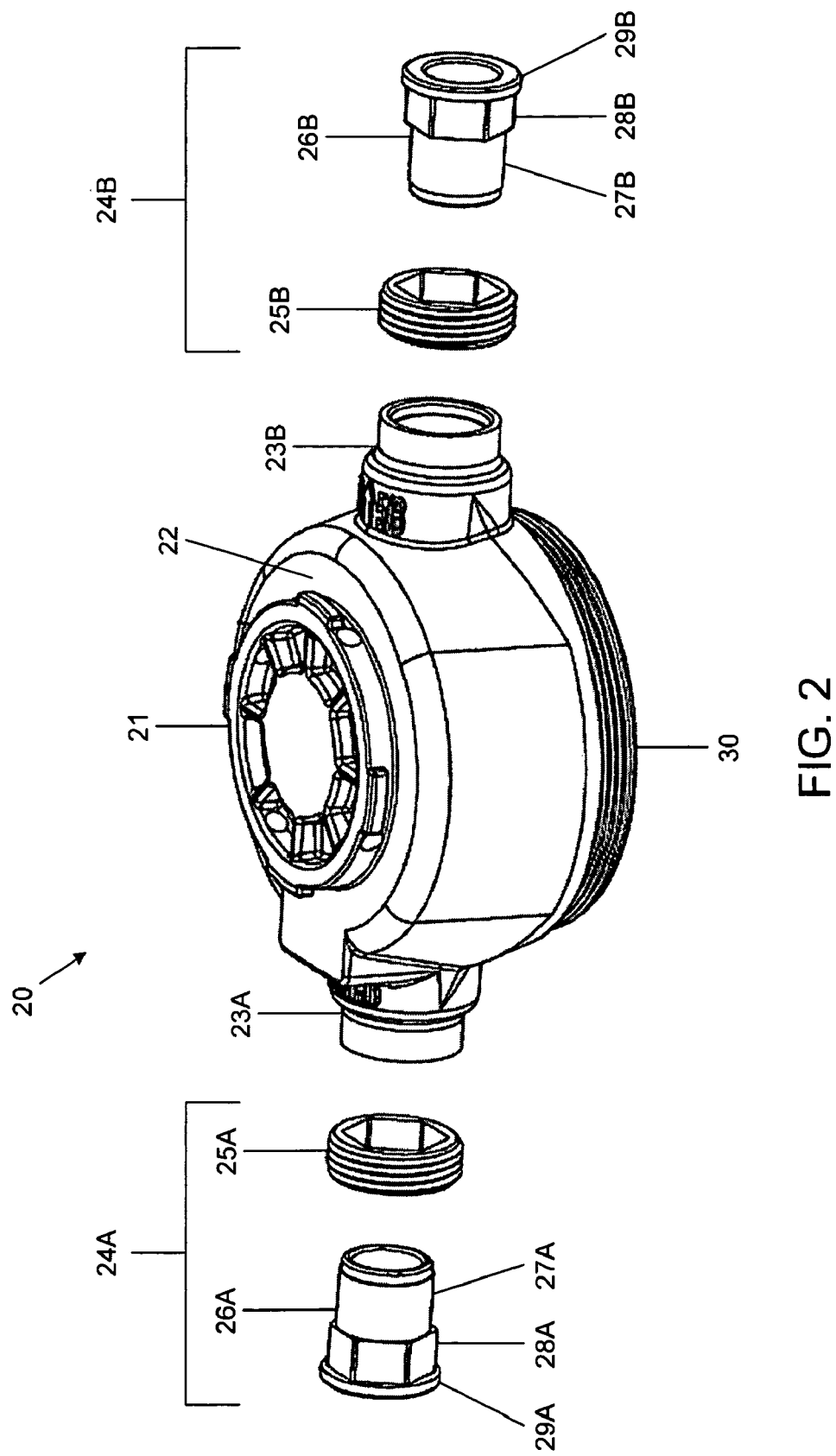
FIG. 2 is an exploded view of the housing assembly 20 shown in FIG. 1.
Figure 3:
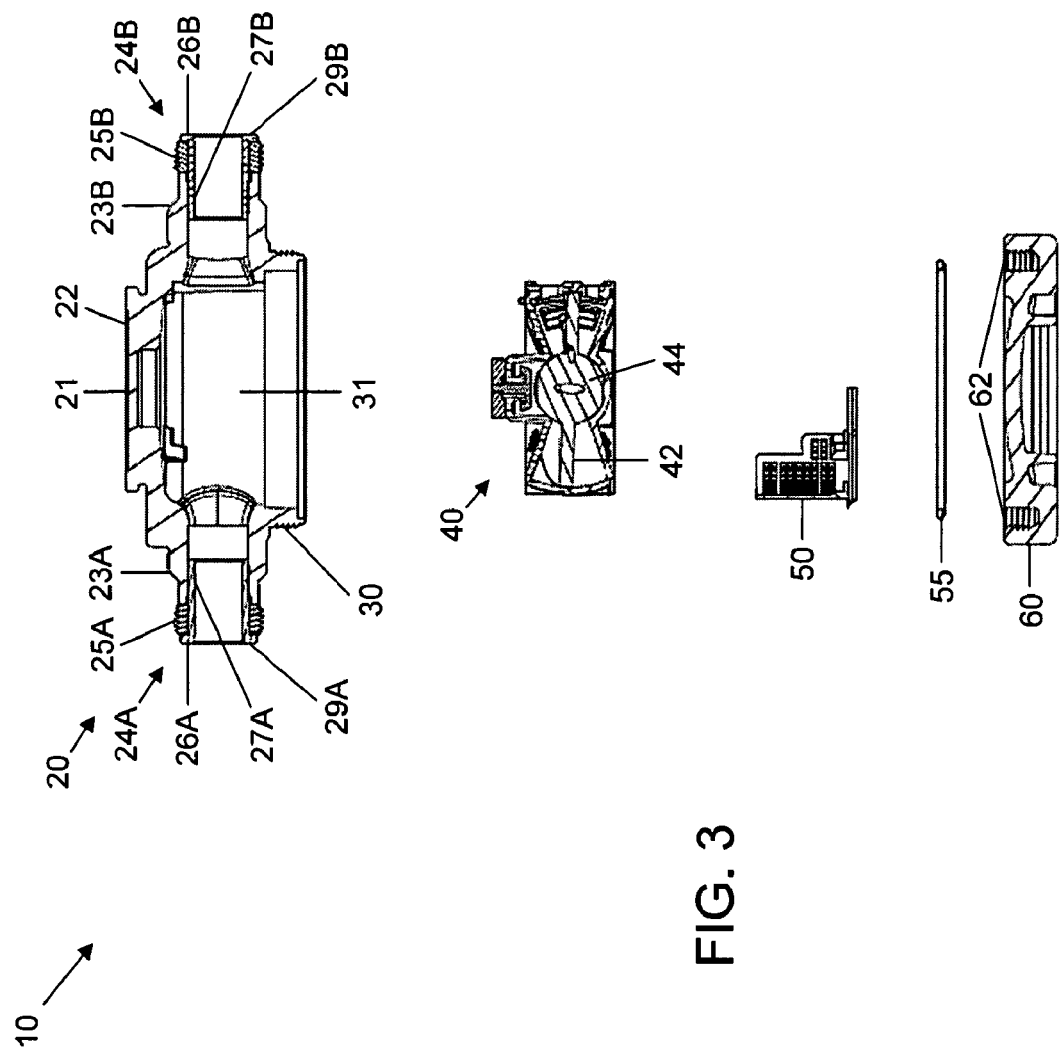
FIG. 3 is an exploded, cross-section view of a plastic water meter 10 according to one embodiment of the invention.

Referring to FIGS. 2 and 3, the housing assembly 20 may include a top cover 21 and two connector assemblies 24A, B. Each connector assembly 24A, B may include a plastic spud insert 26A, B and a metal ring 25A, B, and one connector assembly may function as an inlet connector assembly 24A and the other connector assembly may function as an outlet connector assembly 24B. Additionally, the top cover 21 may include an integrated inlet spud 23A and an integrated outlet spud 23B. The top cover 21 and the two spud inserts 26A, B may be made from various types of plastic or high-strength polymer materials, including styrene, polystyrene, nylon, or the like. In a preferred embodiment, the top cover 21 and the two spud inserts 26A, B may be composed of glass reinforced thermoplastic. Factors that may be considered when selecting a material include working pressures of the meter, and working temperature ranges.

The top cover 21 may be substantially cylindrical in shape with an integrated top face portion 22, although those skilled in the art will recognize that the top cover 21 may take other shapes. The bottom of the top cover 21 remains open, thus forming an aperture that leads to the interior cavity 31 of the top cover 21.

Proximate the bottom of the top cover 21 may be external threads 30, which may enable the bottom cover 60 to engage to the top cover 21. In use, the top cover may flex outwards because of pressure in the system thereby causing the internal threads in the top cover to be urged against the complementary threads on the bottom cover. In other embodiments, the top cover may include internal threads designed to engage external threads on the bottom cover.

One advantage of the external bottom threads 30 provided in various embodiments of the present invention may be that external bottom threads 30 are easier to manufacture than internal bottom threads. As will be understood by those skilled in the art, forming internal threads requires an insert mold, while forming external threads does not. In some cases, an additional manufacturing step may be required to remove the internal thread mold insert, which may reduce the efficiency of the molding process.

In the illustrated embodiment, the top cover 21 may include an integrated inlet spud 23A, through which water enters the interior cavity 31 defined by the top cover 21, and an integrated outlet spud 23B, through which water exits the top cover 21. The inlet spud 23A and outlet spud 23B may be in communication with the interior cavity 31 of the top cover 21. Also, the inlet spud 23A and the outlet spud 23B may be each designed to receive and engage a portion of the spud insert 26A, B.

Both the inlet spud 23A and the outlet spud 23B protrude substantially perpendicularly from the exterior of the top cover 21, with the outlet spud 23B situated approximately 180 degrees around the exterior of the top cover 21 from the inlet spud 23A. As will be understood by those of skill in the art, the inlet spud 23A and outlet spud 23B may have a relative orientation other than 180 degrees.

The spuds 23A, B may be substantially similar to each other and may have a substantially cylindrical in shape. Each spud 23A, B defines an axial bore with a proximate orifice that opens through the wall of the top cover 21 into the interior cavity 31 of the top cover 21 and a distal orifice that opens away from the top cover 21. The proximate orifice and distal orifice of each spud 23A, B may be substantially circular in shape. In alternative embodiments of the present invention, each spud 23A, B, may not protrude from the exterior of the top cover 21, but may instead be an orifice in the exterior of the top cover 21.

The bores defined by the inlet spud 23A and the outlet spud 23B may be each sized to receive a spud insert 26A, B respectively, and each spud insert 26A, B may include an externally threaded metal ring 25A, B. A purpose of the threaded metal rings 25A, B may be to facilitate connection of the water meter to a water system, which generally utilizes metal threads for the connection to the water meter. Each spud insert 26A, B may be substantially cylindrical in shape with a bore formed therein to allow the passage of water.

Each spud insert 26A, B may include a first end proximate to the top cover 21 and a second end distal the top cover 21. Proximate the second end of each spud insert 26A, B may be an annular lip portion or rim 29A, B that extends outwardly. Each threaded metal ring 25A, B may be positioned proximate the annular lip portion 29A, B on the spud insert 26A, B. A purpose of the annular lip portion 29A, B may be to aid in positioning the threaded metal ring 25A, B on the spud insert 26A, B and to discourage removal of the threaded metal ring 25A, B when the spud insert 26A, B may be engaged with the top cover 21, as will be discussed in greater detail later. Additionally, the spud insert 26A, B may include a collar portion 28A, B that may have a circumferential profile and may be positioned proximate to the lip portion 29A, B. The collar portion 28A, B may be shaped to engage a complementary shaped profile of the inner surface of the threaded metal ring 25A, B to discourage relative rotation between the threaded metal ring 25A, B and the spud insert 26A, B. In one embodiment, the circumferential profile of the collar portion 28A, B may define a shape having at least one linear section or facet. In other embodiments, the circumferential profile of the collar portion 28A, B may define a shape having a plurality of linear sections. In such embodiments, the circumferential profile may take the shape of, for example, a triangle, square, pentagon, hexagon, or octagon. In even more embodiments, the circumferential profile of the collar portion 28A, B may be substantially oval. In further embodiments, inner surface of the threaded metal ring 25A, B may engage the collar portion 28A, B by a key-fit arrangement.

Extending from the collar 28A, B of each spud insert 26A, B may be an engagement portion 27A, B. This engagement portion 27A, B may have a cylindrical shape and may be sized to be positioned within the axial bore of a spud 23A, B. The orifice proximate the engagement portion 27A, B of each spud insert 26A, B may be substantially circular in shape and may be substantially perpendicular to each cylindrically-shaped spud insert 26A, B. In various embodiments, the exterior diameter of the engagement portion 27A, B of each spud insert 26A, B may be substantially similar to the interior diameter of the axial bore of each spud 23A, B. Thus, the engagement portion 27A, B of each spud insert 26A, B fits snugly into its associated spud 23A, B. In some embodiments, there may be a mild interference fit. The spud insert 26A, B may be secured to the respective spud 23A, B using spin welding, solvent welding, sonic welding, or an adhesive. An advantage of this arrangement may be that the metal threads do not contact the water supply and therefore do not impact the zero lead content requirements present in many jurisdiction.

The threaded metal ring 25A, B may be made from various types of metals and metal alloys, including brass, bronze, brass or bronze derivatives, stainless steel, or other similar metal materials. In a preferred embodiment, the threaded metal ring 25A, B may be made of bronze. Factors that may be considered when selecting a material for the threaded metal ring 25A, B include material strength and corrosion resistance.

In alternative embodiments, the top cover 21 may include one spud or may include more than two spuds, in accordance with the present invention. In such embodiments, each spud would be similar in construction to the spuds disclosed above and would be shaped to engage a spud insert that may include a metal threaded ring, in accordance with the above disclosure.

In various embodiments, the metering device 40 may be a nutating disk displacement flow meter, wobble plate meter, or other metering device known in the art. The metering device 40 may contain an inlet through which water enters the metering device 40 and an outlet through which water exits the metering device 40. Referring to FIG. 3, the metering device 40 may contain a nutating disk 42 mounted on a sphere 44 that is "wobbled" by the fluid flow where each "wobble" represents a finite amount of fluid transferred. It should be understood that other types of metering devices may be used in connection with the present invention.

The strainer 50 may be semi-cylindrical in shape and may be designed to be situated between the inlet spud of the top cover 21 and the inlet of the metering device 40. The strainer 50 may be designed to strain foreign objects from the water before the water enters the metering device 40.

The metering device 40 and the strainer 50 may be positioned inside the top cover 21 and the bottom cover 60 may enclose them within the top cover 21. The bottom cover 60 may be circular in shape and may contain a top face that may be configured to be positioned proximate to the top cover 21 and a bottom face that may be distal to the top cover 21. The top face of the bottom cover 60 may contain a substantially annular channel that may be shaped and sized to engage the bottom end of the top cover 21. In particular, the width of the channel may be substantially similar to thickness of the wall of the bottom end of the top cover 21. The exterior wall of the channel may include threads that are configured to engage the external bottom threads 30 of the top cover 21 to enclose the metering device 40 and the strainer 50 within the interior cavity 31 of the top cover 21.

The bottom cover 60 may be made from various types of plastic or high-strength polymer materials, including styrene, polystyrene, nylon, or the like. In a preferred embodiment, the bottom cover 60 may be composed of glass reinforced thermoplastic. Factors that may be considered when selecting a material include working pressures of the meter, and working temperature ranges.

The o-ring 55 may be positioned in the channel to provide a seal between the top cover 21 and the cover 60. In the illustrated embodiment, the cross section of the o-ring is circular; however, other o-ring profiles may be used in connection with embodiments of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A water meter comprising:
   a non-metallic cover defining an interior cavity shaped to accept a metering device;
   the metering device positioned in the interior cavity;
   a metal ring including an inner surface and an outer surface, wherein threads are formed on the outer surface;
   a collar portion contacting the inner surface of the metal ring; and
   an annular lip portion retaining the metal ring relative to the non-metallic cover.

2. The water meter of claim 1, wherein the collar portion and annular lip portion are connected to the non-metallic cover.

3. The water meter of claim 1, further comprising at least one spud connected to the non-metallic cover and defining a bore in communication with the interior cavity.

4. The water meter of claim 3, wherein the at least one spud includes at least an inlet spud and at least an outlet spud.

5. The water meter of claim 4, wherein the at least one inlet spud is situated approximately 180 degrees opposite the at least one outlet spud.

6. The water meter of claim 3, wherein the collar portion is connected to the at least one spud.

7. The water meter of claim 6, wherein the annular lip portion is connected to the collar portion.

8. The water meter of claim 7, wherein the collar portion and annular lip portion are connected to the at least one spud.

9. The water meter of claim 3, wherein at least one spud insert engages each at least one spud.

10. The water meter of claim 9, wherein the collar portion and annular lip portion are connected to the at least one spud insert.

11. The water meter of claim 9, wherein the at least one spud insert includes an engagement portion to engage the at least one spud inside the bore.

12. The water meter of claim 1, further comprising a bottom cover fixedly attached to the non-metallic cover and enclosing the metering device within the interior cavity.

13. The water meter of claim 1, wherein the collar portion has a profile complementary to the inner surface of the metal ring.

14. The water meter of claim 1, wherein the collar portion receives the metal ring.

15. The water meter of claim 14, wherein the collar portion receives the metal ring by a key-fit arrangement.

16. The water meter of claim 1, wherein the non-metallic cover is of a material selected from the group consisting of styrene, polystyrene, nylon, and glass reinforced thermoplastic.

17. The water meter of claim 1, wherein the metering device includes a nutating disk displacement flow meter.

18. The water meter of claim 1, wherein the circumferential profile of the collar portion defines a shape including at least one linear section.

19. The water meter of claim 1, wherein the circumferential profile of the collar portion is substantially oval.

20. The water meter of claim 1, wherein the metal ring is of a material selected from the group consisting of brass, bronze, brass derivatives, bronze derivatives, and stainless steel.

* * * * *